United States Patent Office 3,308,087
Patented Mar. 7, 1967

3,308,087
NON-SETTLING CHLOROPRENE COPOLYMER MODIFIED PHENOLIC RESIN ADHESIVE SOLUTION
Robert Roth Garrett, West Chester, Pa., assignor to E. I. du Pont de Nemours and Company, Wilmington, Del., a corporation of Delaware
No Drawing. Filed Nov. 17, 1964, Ser. No. 411,705
6 Claims. (Cl. 260—31.2)

This application is a continuation-in-part of my copending application Serial No. 336,349, filed Jan. 8, 1964 now abandoned. This invention relates to novel solvent cement compositions and, more particularly, it relates to such compositions containing carboxylic acid-bearing chloroprene polymers which show exceptional resistance to stratification during storage and which rapidly produces bonds having good strength, even at elevated temperatures.

Chloroprene polymers are well known as bases for solvent adhesives which find use in many fields of industry. While chloroprene polymer solvent solutions generally are chemically stable for extended periods of time, many solvent adhesive formulations have the undesirable property of flocculating and settling during storage. This behavior which can lead to the formation of two layers, a clear liquid over a flocculent precipitate of solids, appears to be physical in nature and does not cause permanent damage to the adhesive formulations. It is troublesome because the cement must be mixed before it is used and this may be difficult and time-consuming if large containers are involved. Furthermore, if stratified material is used inadvertently without mixing, the chemical composition and consistency of the adhesive and the bond strength which it produces will vary as the cement is consumed.

The tendency for stratification to occur depends on the manner in which the cement is prepared, the solvent mixture employed for dissolving the chloroprene polymer and the nature of the chloroprene polymer base. The presence of other ingredients, such as oil-soluble phenolic resins, which often are included in chloroprene polymer solvent adhesives, also has an effect on the tendency toward flocculation or stratification. Even when all recognized variables are optimized, an occasional cement sample will stratify; but when formulation calls for ingredients other than those minimizing this problem, stratification is a continual, annoying problem. Chloroprene polymer cements containing magnesium-modified heat-reactive phenolic resins, which cements are popular because of the relatively high cohesive strength of their bonds at elevated temperatures, show a very strong tendency to stratify on standing.

As indicated above, chloroprene polymer cements which produce useful elevated temperature bonds may be produced through the introduction of certain resins. However, this technique for improving cohesive bond strength at higher temperatures is not adequate for certain applications, in which case it may be necessary to resort to curing the chloroprene polymer in the cements to a crosslinked elastomer. Cured elastomer bonds are easily prepared from many chloroprene polymer solvent cements by the addition of conventional accelerators or curing agents, but the cement solutions gel quickly once the addition of the curing agent has been made. The need for adding the curing agent just before use is inconvenient and can be wasteful of cement if more cement than is actually required is mixed with the curing agent.

In summary, conventional chloroprene polymer based solvent cements, while outstanding in most respects, suffer from two disadvantages: a tendency to phase in storage and, for certain applications at high temperatures, a need for the use of curing agents, which once added lead to gelation.

Quite unexpectedly, it has been found that a solvent cement composition which resists stratification during storage and which eliminates the need for the use of curing agents for certain high-temperature applications can be prepared by incorporating an organic solvent solution of a carboxyl-containing chloroprene copolymer into a composition together with about 10 to 100 parts of an oil-soluble phenolaldehyde resin per 100 parts of copolymer and an alkaline stabilizing ingredient selected from the group consisting of magnesium oxide, calcium oxide, calcium sulfide, and lead oxide and mixtures thereof added in amounts at least equivalent to 2 parts of magnesium oxide per 100 parts of copolymer. The copolymer, which may contain from about 0.02 to about 0.7 weight percent carboxyl groups, may be prepared by polymerizing chloroprene with a carboxyl-containing monomer of the formula

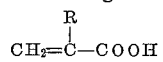

where R is hydrogen or $C_1$ to $C_4$ alkyl, in such amounts as to give the desired carboxyl content in the copolymer. Alternatively, a copolymer of chloroprene and the carboxyl-containing monomer containing up to about 1 percent by weight of carboxyl groups can be blended with a conventional chloroprene polymer in such amounts that the mixture contains from about 0.02 to about 0.4 weight percent of carboxyl groups, based on the weight of the polymer mixture.

The preparation of the carboxyl-containing chloroprene polymers will be described hereinafter with reference to the preparation of a chloroprene/methacrylic acid copolymer. Chloroprene containing from about 0.1% to 5.0% by weight of dissolved methacrylic acid is emulsified in water through the use of surfactants such as the organic sulfonates or organic sulfates. The quantity of methacrylic acid determines the approximate concentration of acid units in the final copolymer. A modifying agent or chain transfer agent should be included in the emulsion to control the molecular weight and viscosity of the finished polymer. As known by those skilled in the art, increasing amounts of a given modifier lower molecular weight and viscosity. Examples of suitable modifying agents are aliphatic mercaptans having 4 to 18 carbon atoms and dialkyl xanthogen disulfides in which the alkyl groups have 1 to 8 carbon atoms. Polymerization is accomplished by means of a redox catalyst, examples of which are potassium persulfate in combination with sodium sulfite, hydrogen peroxide in combination with potassium hydrosulfite, cumene hydroperoxide with sodium formaldehyde sulfoxylate and potassium ferricyanide with sodium sulfite. The catalyst components should be added to the system in such a way as to give a controllable polymerization. The polymerization can be conducted at temperatures ranging from about 0° C. to 60° C., but temperatures around 40° C. are preferred. It is preferred that the reaction be allowed to reach a high conversion in order to insure adequate copolymerization of the less reactive acid comonomer. Thus, the conversion should be above about 70% and preferably around 90%. The progress of the polymerization may be followed by the change in specific gravity. When the desired conversion has been reached the polymerization may be stopped by the addition of substances such as phenothiazine, p-tert-butylpyrocatechol and di-tert-butyl hydroquinone.

An alternative method is to form an emulsion containing all of the methacrylic acid and only part of the chloroprene and gradually to add an emulsion containing the remainder of the chloroprene to the system during the course of the polymerization. Optionally, sulfur or sulfur dioxide may be present during the polymerization to incorporate polysulfide or sulfonyl linkages into the copolymer.

Polymer may be isolated directly from the polymerization mass by removing unreacted chloroprene by steam-stripping as disclosed in U.S. Patent 2,467,769, for example, followed by freeze coagulation as disclosed in U.S. Patent 2,187,146. It is preferable, however, to adjust the hydrogen ion concentration in the latex to a pH of 8 or above with a base, such as dilute sodium hydroxide or ammonium hydroxide before steam-stripping and freeze coagulation. This adjustment of pH prior to these operations minimizes the amount of coagulum formed during the isolation. For this adjustment a 2% solution of sodium hydroxide is especially preferred. Copolymers isolated without pH adjustment are believed to contain free carboxyl groups introduced by the methacrylic acid. The carboxyl groups of copolymers isolated following pH adjustment with a base are believed to exist partially in the form of their salts. While sodium salts are preferred, the carboxyl groups in the copolymer may be in the form of a salt formed with any monovalent cation. Using similar methods, acrylic acid or another copolymerizable carboxyl-containing monomer may be copolymerized with chloroprene.

Copolymers produced by this procedure or related procedures which contain about 0.02% to 0.7% carboxyl groups may be used directly in preparing the solvent cements of this invention. The preferred concentration of carboxyl groups is from about 0.1% to 0.4%. Cements prepared from copolymers having less than about 0.1% carboxyl groups are less consistently non-stratifying and do not show all of the advantages in regard to high temperature bond strength that are exhibited by cements prepared from preferred copolymer compositions. Cements derived from copolymers containing more than about 0.4% carboxyl groups are more viscous than cements prepared from preferred copolymers and are less convenient to handle. When copolymers containing more than about 0.7% carboxyl groups are used, the preparation of the cements is difficult because the polymers tend to be insoluble in the cement formulation. Even when cements can be prepared from these polymers, the cements tend to be too viscous to be of practical use. Cements based on copolymers containing less than about 0.02% carboxyl groups show limited improvement in regard to phasing and relatively insignificant increases in high temperature bond strengths.

As indicated hereinbefore, copolymers containing up to about 1% carboxyl groups can be used to prepare the compositions of this invention if they are blended with conventional chloroprene polymers to form mixtures containing from about 0.02 to 0.2% by weight of carboxyl groups based on the total weight of polymer. Such blends exhibit similar properties to the unblended copolymers when used in solvent cements, especially if the major component in the blend is the carboxyl group-containing copolymer. These blends may be made by mixing solid copolymers with a conventional chloroprene polymer on standard rubber mills or in Banbury mixers or by mixing the latices and co-isolating the polymers. The blends may also be prepared by dissolving both the copolymer and conventional chloroprene polymer in a suitable solvent, or they may be dissolved separately and mixed as solutions subsequently. It is even possible to prepare an unblended copolymer cement composition of the present invention and to mix this with a conventional cement composition differing only in the chloroprene polymer employed, so as to produce a composition containing a blend of copolymer and conventional polymer within the limits of this invention.

The weight percent of carboxyl groups is calculated on the assumption that all of the carboxyl groups are present in the copolymer in the acid form. The content in the copolymer of the carboxyl-containing comonomer is determined by known methods, such as by infra-red analysis, and the carboxyl content is calculated from this value.

Conventional chloroprene polymer adhesives normally contain one or more alkaline stabilizing ingredients such as zinc oxide and magnesium oxide. These ingredients are required to insure good aging of the chloroprene polymers. In addition, they slowly vulcanize deposited films at ambient temperatures. The cement and coating compositions of the present invention also require the inclusion of alkaline stabilizing ingredients for the same reasons. These alkaline ingredients appear to play an even more important role as curing or crosslinking agents for chloroprene copolymers containing carboxyl groups. In the carboxyl-containing copolymers, these bivalent alkaline stabilizing ingredients are believed to form ionic crosslinks through salt formation. In conventional curing of chloroprene polymers curing presumably involves reaction with allylic chlorines.

The alkaline stabilizing ingredients which have been found to be useful in preparing the compositions of the present invention are magnesium oxide, calcium oxide, calcium sulfide, and lead oxide. Magnesium oxide is the preferred alkaline agent since it gives the best results. Calcium oxide and calcium sulfide and lead oxide (litharge) are effective alkaline ingredients since the cements containing these agents are non-phasing and rapidly produce strong bonds at room temperature. The advantages of calcium oxide and calcium sulfide are not as marked in producing strong bonds at high temperatures. Cements containing lead oxide are likely to become excessively viscous after a week or two. However, this disadvantage is offset by the rapidity at which good bonds are produced and by the excellent hot bond strengths obtained from cements containing lead oxide.

The quantity of alkaline ingredients which should be employed in the compositions of the present invention should be chemically equivalent to at least 2 parts of magnesium oxide per 100 parts of chloroprene polymer. It should be noted that when mixtures of alkaline materials are used, it is only necessary that the total equivalents of alkaline materials be chemically equivalent to 2 parts of magnesium oxide per 100 parts of chloroprene polymer. While the upper limit is not particularly critical, the amount of alkaline ingredient should probably not exceed an amount about equivalent to 30 parts of magnesium oxide per 100 parts of polymer. Preferred amounts range from the equivalent of about 4 parts to about 10 parts of magnesium oxide per 100 parts of polymer. This amount of the alkaline agent present includes the amount which has reacted with the resin.

Resins are often included in conventional chloroprene polymer solvent adhesives to improve tack retention, reduce apparent viscosity or increase adhesion and cohesion. Resins may be used for similar purposes in the compositions of the present invention but in addition, oil-soluble phenolaldehyde resins are required in amounts of about 10–100 parts to prevent rapid gelation of the solvent cement. Two general classes of oil-soluble phenolic resins are useful in the cements of this invention, namely, thermoplastic resins and heat-reactive resins.

The thermoplastic, oil-soluble phenol-aldehyde resins generally have moderately low molecular weights, are relatively free of crosslinking and usually contain hydrocarbon substituents which confer oil-solubility. Representative resins include terpene-modified phenolic resins, furfural-phenolic resins and phenolic-modified coumaroneindene resins. Of these resins, the terpene-modified phenolics are preferred. These materials may be made by acid condensation of terpene hydrocarbons or alcohols with phenol, followed by catalytic resinification of the substituted phenol with formaldehyde. The cement compositions of the present invention require the presence of 10 to 100 parts of thermoplastic phenolic resin to produce materials which do not gel too rapidly to be convenient to use. Preferred amounts of these resins range from 20–70 parts per 100 parts of chloroprene copolymer. Although the thermoplastic resins do not yield cements which remain free of gel for extended periods of time, they allow the preparation of compositions which do not gel for periods of 2 to 6 weeks. This life is adequate for many purposes. In the absence of the resins, the gelation takes place in a matter of hours. The compositions containing the thermoplastic resins have good tack retention. They are stable in regard to phasing caused by flocculation and settling. They yield bonds which are much stronger at elevated temperatures than those produced by conventional chloroprene polymer-solvent cements containing thermoplastic oil-soluble phenol-aldehyde resins.

The heat-reactive phenolic resins are preferred for preparing the novel adhesives of this invention. This class of oil-soluble phenolics may be prepared by reacting 1 mole of a para-substituted phenol with about 1–2 moles of formaldehyde in the presence of an alkaline condensation catalyst. Phenols substituted in the para-position with alkyl groups having 3 to 8 carbon atoms are useful for preparing these resins. Examples of such phenols include p-isopropyl phenol, p-tert-butyl phenol, p-cyclohexyl phenol, p-tert-amyl phenol and p-octyl phenol. Resins derived from p-tert-butyl phenol are especially preferred and are readily available. Aryl-substituted phenols, such as p-phenyl and tolyl-phenols, may also be used.

The resins formed from these phenols melt on heating in their original state but on reacting with the alkaline material, they form a modified resin which no longer melts on heating, but instead decomposes only at very high temperatures on the order of 250° C. These resins still retain their oil-solubility after being modified by reaction with the alkaline material. These reacted resins will hereafter be referred to as modified resins.

Incorporation of the modified resins into conventional chloroprene polymer cements, in amounts ranging from about 10 to 200 parts, improves hot bond strength markedly. The same effect is noted with the novel cement compositions of the present invention when the modified resins are used in similar quantities. It should be noted, however, that the cement compositions of this invention already possess greater cohesive bond strengths in the temperature range of 80 to 120° C. when prepared with thermo-plastic resins than do conventional chloroprene polymer cements containing heat-reactive modified resins. As a result, the combination of special copolymers and modified resins included in this invention exhibit high temperature bond strengths about three to ten times greater than those of prior art chloroprene polymer cements containing such resins. When these properties are coupled with the non-settling characteristics exhibited by the compositions of this invention, it is obvious that the present invention represents a significant advance in the art. In regard to settling it should be noted that prior art cements containing modified resins caused the greatest amount of trouble as stated hereinbefore. In other words, compositions included within the present invention eliminate the phasing problem associated with the best prior art high temperature bond cements and at the same time yield bonds exhibiting a highly significant increase in strength at elevated temperatures.

In contrast to cements prepared with thermoplastic phenolic resins, the solvent cements of this invention which contain the modified phenolic resins do not gel even after prolonged storage. Cements containing less than 10 parts of modified resin do exhibit high viscosities immediately or shortly after preparation, but cements containing at least 10 parts of resin have initial viscosities in the range of conventional chloroprene polymer cements and do not increase significantly in viscosity with time. This stability in regard to solution viscosity is another advantage of compositions of this invention which contain modified resins.

An additional advantage associated with any of the cement compositions of the present invention is their rapid rate of bond development compared with conventional cements. Cohesive bond strengths for cements of the present invention are three to ten times greater after 1 hour than those observed with conventional cement bonds. Bond strength development in conventional cements is attributed to crystallization of the polymer while ionic crosslink formation is believed to be responsible in cement bonds of the present invention.

Any of the solvents or solvent mixtures commonly used in preparing conventional chloroprene solvent adhesives and coatings may be used in preparing the compositions of the present invention. The preferred solvents are usually blends of two or more organic materials. Aromatic hydrocarbons, such as toluene and xylene, aliphatic hydrocarbons, ketones, esters, and chlorinated hydrocarbons are useful classes of materials for preparing solvent blends for chloroprene polymer adhesives and coating compositions.

The following are examples of useful solvent combinations with composition indicated in parts by volume.

| | |
|---|---|
| Toluene | 1 |
| Hexane | 1 |
| Ethyl acetate | 1 |
| Toluene | 3 |
| Hexane | 3 |
| Ethyl acetate | 3 |
| Trichloroethylene | 1 |
| Acetone | 3 |
| Heptane | 7 |
| Toluene | 2 |
| Ethyl acetate | 8 |
| Toluene | 1 |
| Hexane | 1 |
| Methyl ethyl ketone | 1 |

Although the adhesive compositions of the present invention require only four components for their preparation—chloroprene copolymer, the alkaline compound, an oil-soluble phenolic resins, and a suitable solvent or solvent blend—other components which find use in conventional chloroprene polymer adhesives often may be added to advantage.

In order to insure the excellent aging properties associated with chloroprene polymers, it is desirable to include an antioxidant in the present compositions. Any antioxidant employed in conventional chloroprene polymer adhesives may be incorporated. About 2 parts of antioxidant per 100 parts of elastomer is usually adequate. If discoloration is no problem, N-phenyl-beta-naphthylamine is preferred. If a non-staining, non-discoloring antioxidant is required, a variety of alkylated phenol type antioxidants may be used.

Zinc oxide, which is usually included in chloroprene polymer formulations, may also be present in the compositions of this invention. Suitable amounts range from 2 to 10 parts by weight per 100 parts of chloroprene polymer.

Conventional fillers such as clay, whiting, and carbon black may be added to the cements of this invention. Pigments such as titanium dioxide may also be added. These fillers tend to decrease the cohesive strength of the film produced by the cement, but reduce the cost of the adhesive. The loss in cohesive strength is not important in certain uses. This is especially true when pigmented compositions of this invention are used for coatings. For certain applications, the fillers may improve properties such as color, weatherability, hardness, etc.

As previously mentioned, conventional curing agents, which are believed to bring about crosslinking through allylic chlorines, have often been required in chloroprene polymer adhesives which are used to prepare bonds for high temperature applications. While conventional curing agents normally are not necessary with the adhesive compositions of the present invention, they may be useful in applications demanding a maximum of resistance to plastic flow. Any of the curing systems which are satisfactory for conventional chloroprene polymer cements may be used with the compositions of this invention. Examples of suitable curing agents include 2-mercapto-2-imidazoline, thiocarbanilide, combinations of litharge and aldehyde-aniline condensation products, and 1,3,5-triethyl-s-triazine, alone or in combination with litharge. These agents are normally used in amounts of 2–4 parts per 100 parts of elastomer, with the exception of litharge which usually is added at a level of 20 parts per 100 parts of elastomer. The addition of about 2 to 4 parts of sulfur to cements containing litharge and aldehyde-aniline condensation products gives rapid room temperature cures. The addition of 2 to 4 parts of an organic polyisocyanate, such as 4,4'-diisocyanatodiphenylmethane, per 100 parts of chloroprene polymer yields room temperature cures and gives increased bond strength in many applications involving the bonding of elastomers to synthetic fibers. When curing agents are added to the cements of this invention, best results are obtained if the addition is made just prior to use. As with conventional cements, the pot life of the cement is limited once the curing agent has been introduced so that it is necessary to prepare cement essentially as it is consumed. As previously indicated, the compositions of this invention should limit the need for employing conventional curing agents with chloroprene polymer cements. Since carboxyl-containing copolymer cements are stable and essentially as resistant to plastic flow as cured conventional cements, the problems encountered with conventional curing agents can largely be avoided.

Preparation of the solvent adhesive compositions of this invention may be accomplished by the procedures employed for the manufacture of conventional chloroprene polymer cements. The most common procedure is to mill-mix the chloroprene polymer with compounding ingredients, not including the resin, and to dissolve the resulting compound and the resin in solvent in a cement churn or other suitable mixer. This technique is satisfactory with the chloroprene copolymers required in this invention, but milling should be kept to a minimum for the compounded copolymers tend to scorch more readily than do conventional adhesive grades of chloroprene polymers. While mill-mixing often results in better dispersion of dry ingredients, it is usually not required with the copolymers used in this invention and the slurry method may be used. This latter procedure involves adding the dry ingredients to a churn containing copolymer, resin, and solvent and agitating until the copolymer dissolves. If difficulty is experienced in getting a proper dispersion of solids with the slurry method, the dry ingredients can be dispersed in a portion of solvent in a ball mill before addition to the churn containing copolymer, resin, and remaining solvent. As indicated, oil-soluble thermoplastic resins are generally added directly into this churn rather than being mill-mixed into the copolymer. When cements containing modified resins of the heat re-active type are prepared, the unmodified resin may be added to the cement churn along with sufficient alkaline material for modification. The alkaline material may be in the form of dry powder of compounded in the copolymer. Alternatively, the resin and alkaline material can be reacted separately in a portion of the solvent to be used in the final cement and added as a solution of the modified form to the cement churn where blending with the copolymer and other ingredients is accomplished.

Although the compositions of this invention have been described largely in terms of solvent adhesives they are also useful for the preparation of coatings, viscous cements and caulks.

Any of the less viscous compositions of the present invention may be used directly as coatings which can be applied by brushing, dipping or spraying. The amounts and types of solvents employed in preparing compositions for coating purposes may be varied to control viscosity, solids and drying rate. Pigments, such as carbon black and titanium dioxide, may be added to compositions to be used as coatings. An excellent roofing coat can be made by using carbon black in amounts about equivalent to the copolymer content of the composition. This roofing coat is tack-free within 30 minutes and ultimately forms a very adherent film having a smooth low-gloss surface.

Viscous cements, of plastic consistency, can be prepared from the compositions included in this invention. Means available for increasing viscosity include raising the concentration of copolymer, adding large amounts of inert filler and using high Mooney viscosity copolymers. The choice of these means depends somewhat on the proposed use. High viscosity compositions may be applied by spreading and troweling or by means of a caulking gun. These compositions are useful as mastics, sealers and caulks.

If a non-volatile polymeric material is chosen as a solvent, a composition resembling a hot-melt adhesive can be prepared. This type material can be applied at an elevated temperature as a viscous liquid which then reverts to a tough adherent elastomer at normal temperatures. Such compositions are especially useful for sealing and caulking since there is essentially no change in volume accompanying the setting of these materials. A preferred non-volatile solvent for use in this type composition may be prepared by polymerizing chloroprene in the presence of a relatively large amount of a modifier. As previously indicated, increasing amounts of modifier produce polymers of lower molecular weight and lower viscosity.

For some applications it is desirable to use cements which dry to an essentially transparent, inconspicuous film. This property may be important when the cement has been lapped over its proper area of application. Cements of this type can be made from conventional chloroprene polymers by omitting all insoluble solid alkaline ingredients but including modified phenolic resin which is soluble. Such cements while useful have relatively poor hot bond strengths. By preparing similar cements within the composition limits of this invention, a transparent cement can be prepared which actually exhibits greater hot bond strengths than an opaque prior art cement containing normal amounts of insoluble solid alkaline ingredients in addition to magnesium oxide-modified resin.

Cements prepared from certain of the carboxyl-containing copolymers are outstanding with respect to forming adhesive coatings on vinyl resins such as the polymers and copolymers of vinyl chloride. Particularly useful for this purpose are terpolymers of chloroprene with, by weight, 10 to 20% of acrylonitrile, and 0.2 to 0.7% of methacrylic acid.

The invention will now be described with reference to the following examples of specific embodiments thereof wherein parts and percentages are by weight unless otherwise specified.

EXAMPLE 1

A preferred copolymer of methacrylic acid and chloroprene for use in the current compositions of the present invention is prepared by the procedure disclosed in this example. Methacrylic acid is employed in a ratio of 1.33 parts/100 parts of chloroprene.

An emulsion is prepared using the following recipe:

| | Parts |
|---|---|
| Chloroprene | 13,500 |
| Methacrylic acid | 180 |
| Diisopropyl xanthogen disulfide | 120 |
| Water | 18,067 |
| Amine salts of alkylated benzene-sulfonic acids | 176 |
| Sodium salt of formaldehyde-naphthalene-sulfonic acid condensate | 80 |

Polymerization is performed at 40° C. in a nitrogen atmosphere. The polymerization is catalyzed by adding 0.2 part of 30% hydrogen peroxide followed by the addition of 0.05 part portions of 1% potassium hydrosulfite solution. Addition of the potassium hydrosulfite solution is regulated to give the desired rate of polymerization. Polymerization is carried out to about 90% monomer conversion. At this conversion, the specific gravity of the latex is about 0.080 at 40° C. for this recipe.

Polymerization is then stopped by adding 70 parts of an emulsion having the following composition:

| | Parts |
|---|---|
| Water | 21.0 |
| Sodium lauryl sulfate, paste, 30% A.I. | 2.0 |
| Sodium salt of formaldehyde-naphthalene-sulfonic acid condensate | 0.7 |
| Benzene | 45.0 |
| Phenothiazine | 0.7 |
| p-Tert-butylpyrocatechol | 0.7 |

The hydrogen ion concentration of the latex is adjusted to a pH of 8 by the addition of 2% sodium hydroxide solution. Unreacted chloroprene is removed by steam stripping as described in U.S. Patent 2,467,769, after which the copolymer is removed from the latex by freeze coagulation in the form of a thin film as described in U.S. Patent 2,187,146. The Mooney viscosity of this copolymer is about 46–48. ML–212° F., 2.5 minutes. Analysis shows that the methacrylic acid content of the copolymer is approximately 0.45% (0.24% carboxyl groups).

By following the procedure described above and employing greater or lesser amounts of methacrylic acid relative to chloroprene, or by varying conversion at a given chloroprene/methacrylic acid ratio, copolymers containing varying amounts of methacrylic acid can be prepared. By varying the amount of modifier, the viscosity of the polymer may be controlled. Isolation of the copolymers produced by this polymerization procedure may be accomplished by freeze coagulation without prior pH adjustment. Isolation of copolymer from latex by freeze coagulation may also be accomplished following adjustment of the pH to about 8 with 28% ammonium hydroxide.

Cements are prepared from the copolymer using the following recipe:

| | Parts |
|---|---|
| Copolymer | 100 |
| Metal compound (as in Table I(a)). | |
| Heat-reactive resin (same as in Example 2) | 45 |
| Toluene | 165 |
| Ethyl acetate | 165 |
| Hexane | 165 |

All ingredients are combined in a churn and the churn is rolled until a smooth solution is formed.

Test bonds are prepared from the various adhesives as described in Example 4. To show the rapidity of bond formation, bond strength is determined in pounds per linear inch (p.p.l.i.) after 1 hr., 3 hrs., and 1 day, respectively. Bond strengths at 100° C. and 121° C. are also determined 7 days after bonding (after heating the bond at the given temperature for 7 minutes). For comparison data is shown obtained from a conventional polychloroprene cement.

TABLE I(a)

| Metal (Parts) | Bond Strengths (p.p.l.i.) | | | | | | |
|---|---|---|---|---|---|---|---|
| | None | MgO (5) | MgO² (5) | MgO (10) | CaO (7) | CaS (9) | (¹) |
| At 24° C.: Time after bonding— | | | | | | | |
| 1 hr | 1.8 | 6.5 | 12 | 10 | 6 | 8 | 0.7 |
| 3 hr | 3.5 | 14 | 20 | 20 | 8.5 | 12 | 2 |
| 1 day | 8.5 | 33 | 43 | 33 | 28 | 26 | 20 |
| After 7 days bonding: | | | | | | | |
| 100° C | 0.6 | 8.5 | 13 | 10 | 2.4 | 2.5 | 1.3 |
| 121° C | 0.7 | 9.5 | 8.5 | 9.5 | 2.0 | 1.8 | 1.2 |

¹ Conventional polychloroprene cement for control purposes.
² 5 parts of ZnO also used in compounding recipe.

The above table shows the outstanding results obtained using magnesium oxide as the alkaline material, both with respect to rapid formation of bonds and bond strength at high temperatures. Cements containing calcium oxide or calcium sulfide exhibit rapid bond formation and, at high temperatures, give bond strengths slightly superior to those obtained using the conventional polychloroprene cement.

A two-part cement is prepared as follows: 100 parts of the experimental polymer is dissolved in 160 parts of ethyl acetate and 160 parts of hexane. A resin solution is prepared containing 160 parts of toluene, 45 parts of the heat-reactive resin, 1 part of water and varying amounts of different alkaline materials as shown in Table I(b). The two solutions are blended in the churn. The results of the various tests are shown in Table I(b).

TABLE I(b)

| Metal (Parts) | Bond Strengths (p.p.l.i.) | | | |
|---|---|---|---|---|
| | MgO (5) | PbO (28) | Both MgO and PbO, 5 and 28, respectively | (¹) |
| At 24° C.: Time after bonding— | | | | |
| 1 hr | 11 | 10 | 14 | 0.7 |
| 3 hr | 19 | 24 | 20 | 2 |
| 1 day | 37 | 45 | 35 | 20 |
| After 7 days bonding: | | | | |
| 100° C | 14 | 26 | 12 | 1.3 |
| 121° C | 8.5 | 12 | 11 | 1.2 |

¹ Same as in Table I(a), repeated here for comparison.

EXAMPLE 2

This example represents preparation of the composition of the invention by mixing a conventional polychloroprene with a relatively high acid content chloroprene/methacrylic acid copolymer.

A chloroprene/methacrylic acid copolymer is prepared essentially by the polymerization procedure described in Example 1, with the exception that 4.7 parts of methacrylic acid is used for every 100 parts of chloroprene. Isolation of the copolymer is accomplished by steam stripping to remove unreacted monomer, passage through an ion exchange column to bring the pH from 2 to 7, concentration to 40% solids and freeze coagulation. The copolymer contains about 1.6% combined methacrylic acid (0.83% carboxyl groups). This product will be referred to as Copolymer A.

A conventional polychloroprene/modified resin solvent cement, which will be referred to as Adhesive A, is prepared by milling together on a conventional rubber mill (a) 100 parts of rapid crystallizing chloroprene polymer (prepared by redox catalyzed polymerization of chloroprene at 10° C. in the presence of dodecyl mercaptan), (b) 4 parts magnesium oxide, (c) 5 parts zinc oxide, and (d) 2 parts of 2,6-di-tert-butyl-4-phenylphenol. About 111 parts of this base is placed in a churn with 156 parts of hexane, 156 parts of toluene, 156 parts of acetone, 45 parts of a phenolic resin prepared by condensing 1 to 2 moles of formaldehyde with 1 mole of p-tert-butyl phenol and 0.5 part of water. These materials are blended in the churn until the mixture has a smooth appearance.

Varying amounts of Copolymer A are dissolved in samples of Adhesive A to prepare a series of cement samples containing increasing amounts of Copolymer A. The cements are stored in sealed cylindrical containers. The composition of these cements and their settling properties are presented in Table II which follows. Settling is expressed in terms of precent settling which is defined as follows:

$$\text{Percent Settling} = \frac{\text{height of clear upper layer}}{\text{total height of sample}} \times 100$$

TABLE II

| Sample | Parts Copolymer A Per 100 parts of Polychloroprene | Weight percent MAA [2] units in Polymer blend | Percent settling after 43 days at 25–27° C. |
|---|---|---|---|
| 2A | [1] 0 | 0.0 | 81 |
| 2B | 3 | 0.05 | 52 |
| 2C | 6 | 0.10 | [3] 9 |
| 2D | 12 | 0.19 | [3] 9 |

[1] Control.
[2] MAA = methacrylic acid.
[3] Traces of undissolved Copolymer A were discernible in these blends.

The samples 2B, 2C, and 2D containing chloroprene/methacrylic acid Copolymer A contain 0.03, 0.05, and 0.1 percent carboxyl groups, respectively, and exhibit a significant improvement in settling behavior even at the lowest concentration of MAA units, when compared with the control sample 2A the latter, of course, not being within the scope of the invention.

EXAMPLE 3

About 1 part of Copolymer A of Example 2 is dissolved in 8.7 parts of toluene. The toluene solution is then added at two levels to Adhesive A of Example 2. Composition of the samples and settling behavior are presented in Table III which follows:

TABLE III

| Sample | Parts Copolymer A Per 100 parts of Polychloroprene | Weight percent MAA units in Polymer blend | Percent settling after 42 days at 25–27° C. |
|---|---|---|---|
| 3A | [1] 0 | 0.0 | 62 |
| 3B | 3 | [2] 0.05 | 9 |

[1] Control.   [2] 0.03% COOH.

This example confirms the results of Example 2 and suggests that the procedure used for blending the samples of this example is more effective than that employed in Example 2. It should be noted that traces of undissolved Copolymer A were discernible in samples C and D of Example 2, suggesting that the full benefit of the chloroprene/methacrylic acid copolymer was not obtained.

EXAMPLE 4

About 23.0 grams of rapid crystallizing polychloroprene (prepared by redox catalyzed polymerization of chloroprene at 10° C. in the presence of dodecyl mercaptan), 2.0 grams of chloroprene/methacrylic acid Copolymer A described in Example 2, 1.0 gram of magnesium oxide, 1.25 grams of zinc oxide and 0.5 gram of 2,6-di-tert-butyl-4-phenylphenol are mill mixed for 10 minutes on a conventional laboratory-scale rubber mill. The polychloroprene blend contains about 0.07% carboxyl groups.

A second mill mix solely for control purposes is prepared and is identical to the first except that 25.0 grams of quick crystallizing polychloroprene are used without any of the chloroprene/methacrylic acid copolymer.

In an agitated vessel, 22.5 grams of the phenolic resin described in Example 2 is dissolved in 80 gram of toluene. To this solution is added 2.0 grams of magnesium oxide and 0.5 ml. of water and the mixture is stirred at room temperature for 2¼ hours. The toluene solution of modified resin is diluted by addition of 80 grams of hexane and 80 grams of ethyl acetate. The diluted solution is divided into two equal portions which are placed in 3-neck, round-bottom flasks fitted with agitators.

The two mill mixes prepared above, i.e., the copolymer blend and the control, are added to separate flasks and stirred for 64 hours over a weekend to form smooth adhesive solutions. The Brookfield viscosity of the adhesive solution prepared from the copolymer blend is 1300 c.p.s. (50 r.p.m., No. 3 spindle); the viscosity of the control is 672 c.p.s.

Test bonds are prepared from the two adhesives by applying three coats of adhesive to each of two 1-inch strips of unsized No. 10 canvas duck, allowing about 30 minutes between coats. Before the last coats are dry, the assemblies are rolled together firmly with a hand roller to insure good contact. One end of each of the canvas strips is left uncoated so that the test assembly may be fastened in the jaws of a tensile testing machine. The test pieces are pulled at a rate of two inches per minute and the force required to separate the test pieces is measured. When the bond strength is determined by this method at 80° C., the copolymer blend adhesive gives about 7 p.p.l.i., whereas the control adhesive displays only about 3 p.p.l.i.

Settling behavior of the two adhesive solutions is measured over a period of time at room temperature in the manner described in Example 2. The results are tabulated below.

TABLE IV

| Sample | Percent Settling | | | |
|---|---|---|---|---|
| | 4 days | 8 days | 15 days | 29 days |
| Control | 34 | 50 | 60 | 60 |
| Copolymer Blend | 0 | 0 | <1 | <1 |

The hot bond strength and settling results clearly indicate the superiority of the adhesives of this invention over prior art adhesives.

EXAMPLE 5

Two emulsions are prepared in agitated vessels in a nitrogen atmosphere according to recipes 5A and 5B in which parts are in grams.

|  | 5A | 5B |
|---|---|---|
| Chloroprene | 420 | 420 |
| Methacrylic acid | 18 | |
| Dodecyl mercaptan | 2.2 | 2.2 |
| Water | 727 | 727 |
| Amine salts of alkylated benzene-sulfonic acids | 11 | 11 |
| Sodium salt of formaldehyde-naphthalene-sulfonic acid condensate | 5.9 | 5.9 |

The emulsions are cooled to about 20° C. and polymerization is initiated by addition of 5 drops of cumene hydroperoxide and several milliliters of 1% aqueous sodium hydrosulfite. Polymerization is continued by dropwise addition of 1% aqueous sodium hydrosulfite solution. As the two polymerizations proceed, emulsions prepared in separate vessels are added to replace the chloroprene monomer as it is consumed by polymerization. These emulsions have the following composition by weight in grams:

Chloroprene _____ 900
Dodecyl mercaptan _____ 2.7
Water _____ 611
Amine salts of alkylated benzene-sulfonic acids ____ 16
Sodium salt of formaldehyde-naphthalene-sulfonic acid condensate _____ 9

The temperature of the polymerization is maintained below about 20° C. by external cooling with an ice-water bath. When the specific gravity of the polymerization mass rises to 1.056, which is equivalent to about an 80% conversion of monomer to polymer, an emulsion of a toluene solution of phenothiazine and di-tert-butylhydroquinone is added to prevent further polymerization.

The two polymers are isolated from their latices by neutralization with 2% aqueous sodium hydroxide, steam stripping to remove unreacted monomer and drum drying. The copolymer prepared from emulsion 5A (which will be referred to as Copolymer 5A) has a Mooney viscosity of about 14 (ML–2½) and contains approximately 1% combined methacrylic acid (0.52% carboxyl groups). The polymer prepared from emulsion 5B (which will be referred to as Control) has a Mooney viscosity of about 28 (ML–2½).

Cements are prepared from Copolymer 5A and the Control by mill mixing 25.0 grams of polymer, 1.0 gram of magnesium oxide, 1.25 grams of zinc oxide and 0.5 gram of 2,2'-methylene-bis(4-methyl-6-tert-butyl phenol) for 10 minutes.

In an agitated vessel, 11.25 grams of the phenolic resin described in Example 2 is dissolved in 40 grams of toluene. To this solution is added 1 gram of magnesium oxide and 0.25 ml. of water and the mixture is stirred at room temperature for 2¼ hours. The toluene solution of modified resin is diluted by addition of 40 grams of hexane and 40 grams of ethyl acetate. The mill mix of Copolymer 5A is added to the resin solution and agitated for 64 hours over a weekend to form a smooth adhesive solution. This cement has a Brookfield viscosity of 173 cps. (100 r.p.m.; No. 3 spindle).

In a second vessel, the mill mix prepared from the Control is converted to a solvent cement by following the procedure in the preceding paragraph. This cement has a Brookfield viscosity of 148 cps.

The cement prepared from Copolymer 5A shows no settling after 90 days storage at 25° C. Even after 90 days at 50° C., it does not settle. In contrast, the cement prepared from the Control polymer settles 40% after only about 18 days at 25° C., and 75% after only about 13 days at 50° C.

In spite of its low Mooney viscosity the cement prepared from Copolymer 5A has a peel strength of about 35 p.p.l.i. at 25° C., about 22 p.p.l.i. at 100° C. and about 5 p.p.l.i. at 150° C., whereas the control cement has a peel strength of about 25 p.p.l.i. at 25° C., only about 2 p.p.l.i. at 100° C. and only about 1 p.p.l.i. at 150° C.

Two other cements are prepared from Copolymer 5A which differ only in the amount of phenolic resin contained in them. In place of the 11.25 grams of resin used above, these cements are made by using 2.5 grams and 16.25 grams of resin. Neither of these cements exhibits any settling over a period of several weeks. The cement containing 16.25 grams or resin exhibits a bond strength of about 15 p.p.l.i. at 100° C.

EXAMPLE 6

A copolymer of chloroprene and methacrylic acid is prepared essentially by the procedure of Example 1 with the exceptions that (1) about 1.36 part of methacrylic acid and 0.19 part of dodecyl mercaptan are used per 100 parts of chloroprene and (2) the polymerization is conducted at 10° C. The polymer is isolated by the procedure of Example 1, which includes neutralization by aqueous sodium hydroxide. The isolated copolymer has a Mooney viscosity of about 150 (ML–2½) and a combined methacrylic acid content of about 0.46% (0.24% carboxyl groups).

A cement is prepared from the copolymer by the procedure of Example 5, using 11.25 grams of phenolic resin. The Brookfield viscosity of this cement is about 6000 cps. at room temperature. The very high viscosity of the adhesive reflects the high Mooney viscosity of the copolymer. This cement may be spread with a brush. After storage for 64 days, this cement does not exhibit any sign of settling. Its bond strength at 125° C. is about 34 p.p.l.i. which is outstanding. At 125° C. a control adhesive prepared from a conventional chloroprene polymer has a bond strength of less than 1 p.p.l.i.

EXAMPLE 7

A copolymer of chloroprene and methacrylic acid is prepared essentially by the procedure of Example 1 with the exceptions that (1) about 2 parts of methacrylic acid and 0.8 part of diisopropyl xanthogen disulfide are used per 100 parts of chloroprene and (2) the polymerization is conducted at about 15° C. The copolymer is isolated by the procedure of Example 1 including neutralization with aqueous sodium hydroxide. The isolated copolymer has a Mooney viscosity of about 26 (ML–2½) and contains about 0.68% combined methacrylic acid (0.36% carboxyl groups).

A cement is prepared from the copolymer by the procedure of Example 5, using 11.25 grams of phenolic resin. The Brookfield viscosity of the cement is 2070 cps. (No. 4 spindle). After 90 days, the cement is free of any sign of settling. It exhibits bond strengths of about 42, 34, 25 and 12 p.p.l.i. at temperatures of 25° C., 80° C., 100° C., and 125° C., respectively.

Similar results are obtained when the solvent mixture of equal parts by weight of toluene, ethyl acetate and hexane is replaced by an equal weight of a solvent mixture consisting of 35 parts of white gasoline and 65 parts of methyl ethyl ketone by weight. In preparing these cements the phenolic resin is modified with magnesium oxide in the gasoline portion of the solvent prior to adding the methyl ethyl ketone.

EXAMPLE 8

A copolymer of chloroprene and methacrylic acid is prepared essentially by the procedure of Example 1 with the exceptions that (1) 1.33 parts of methacrylic acid and 0.33 part of dodecyl mercaptan are used per 100 parts of chloroprene and (2) polymerization is conducted at 10° C. The material is isolated, after addition of aqueous sodium hydroxide, as described in Example 1. This copolymer has a Mooney viscosity of about 40 (ML–2½) and a combined methacrylic acid content of about 0.45% (0.24% carboxyl groups).

A cement is prepared from this copolymer by placing 25.0 grams of the freshly prepared copolymer, 11.25 grams of the phenolic resin described in Example 2, 2 grams of magnesium oxide, 1.25 grams of zinc oxide, 0.5 gram of 2,2'-methylene bis(4-methyl-6-tert-butyl-phenol), 40 grams of toluene, 40 grams of ethyl acetate and 40 grams of hexane in an agitated glass flask. Milling of the copolymer is omitted. This mixture is agitated for about 16 hours to form a smooth solvent cement having a Brookfield viscosity of 654 cps. This cement does not settle over a period of 56 days. It forms bonds having strengths of about 42, 26, 21, and 17 p.p.l.i. at temperatures of 25, 80, 100 and 125° C., respectively.

This example demonstrates the ease with which solvent cements may be prepared from the compositions of this invention. It is preferred, however, that the polymers be freshly prepared in carrying out this procedure. Omission of the milling step does not significantly affect settling behavior or bond strengths.

EXAMPLE 9

Two copolymers of chloroprene and methacrylic acid 9A and 9B are prepared essentially by the procedure of Example 1. Both polymerizations are made using 1.33 parts of methacrylic acid and 0.89 part of diisopropyl xanthogen disulfide per 100 parts of chloroprene. The polymerizations differ in that one, Copolymer 9A, is carried out at about 15° C. and the second, Copolymer 9B, at 40° C. Isolation of both copolymers is accomplished by the procedure given in Example 1, including addition of aqueous sodium hydroxide.

Copolymer 9A (polymerized at 15° C.) has a Mooney viscosity of about 52 (ML–2½) and Copolymer 9B (polymerized at 40° C.) has a Mooney viscosity of about 49 (ML–2½). Both contain approximately 0.45% combined methacrylic acid (0.24% carboxyl groups).

Two solvent cements are prepared from Copolymers 9A and 9B following the procedure given in Example 4. Both cements have good settling behavior. Typical viscosity and bond strengths of these cements is tabulated below. Data for a control cement prepared from a conventional chloroprene polymer are included for comparison.

TABLE V

| Cement Sample | Brookfield Viscosity, cps., No. 4 Spindle | Bond Strength (p.p.l.i.) | | | |
|---|---|---|---|---|---|
| | | 25° C. | 80° C. | 100° C. | 125° C. |
| Copolymer 9A | 580 | 32 | 25 | 17 | 6 |
| Copolymer 9B | 550 | 39 | 24 | 15 | 8 |
| Control | 520 | 39 | 1.1 | 1.0 | 0.8 |

EXAMPLE 10

This example illustrates the preparation of a "transparent" cement which does not contain any alkaline ingredient other than magnesium oxide modified phenolic resin. About 25 grams of Copolymer 5A of Example 5 and 0.5 gram of 2,2'-methylene bis(4-methyl-6-tert-butyl-phenol) are mill mixed for 10 minutes. In a three-neck flask, 11.25 grams of the phenolic resin of Example 2, 1.0 gram of magnesium oxide, 0.5 gram of water and 40.0 grams of toluene are agitated for about 2 hours. About 40 grams of ethyl acetate and 40 grams of hexane are added to the solution of modified resin and the mill mix is added. The entire mixture is agitated until a homogeneous solvent cement is produced. The liquid cement is cloudy in appearance, but bonds formed between pieces of clear plastic are transparent.

Canvas-to-canvas bonds formed with this adhesive have typical strengths of about 37, 17, 12, and 1.9 p.p.l.i. at temperatures of 25, 80, 100 and 125° C., respectively. A similar cement prepared from a conventional chloroprene polymer yields much lower bond strengths at elevated temperatures.

EXAMPLE 11

This example illustrates the preparation of a caulk or hot melt adhesive composition in which the usual volatile cement solvents are replaced with a non-volatile polymeric solvent obtained by the following procedure.

A conventional polychloroprene emulsion is prepared using the following recipe:

| | Parts |
|---|---|
| Chloroprene | 100 |
| Diisopropyl xanthogen disulfide | 4.7 |
| Oleic acid | 3.8 |
| Cumene hydroperoxide | 0.14 |
| Sodium hydroxide | 0.24 |
| Water | 133.33 |

An atmosphere of nitrogen is maintained during preparation of the emulsion and during the ensuing polymerization. A solution containing 0.20 part of ammonium persulfate and 0.006 part of sodium 2-anthraquinonesulfonate in 5.0 parts of water is added to the emulsion in the presence of mild agitation. Polymerization is initiated by adding 0.067 part of solid sodium hydrosulfite dihydrate to the system. The rate of polymerization is controlled thereafter by adding, as needed, a solution of 0.01 part of sodium hydrosulfite dihydrate and 0.0002 part of sodium hydroxide in 0.23 part of water.

Polymerization is stopped when the specific gravity of the latex is 1.063 at 20° C. by the addition of 0.015 part of phenothiazine and 0.015 part of 4-tert-butylpyrocatechol dissolved in toluene and, in turn, emulsified in water containing the sodium salt of a formaldehyde-napthalene-sulfonic acid condensate and sodium lauryl sulfate. The polychloroprene is isolated on a double drum drier, heated with 80 p.s.i.g. steam.

The caulking composition is prepared by milling about 40 grams of the above chloroprene polymer, 50 grams of Copolymer 5A of Example 5, 2 grams of 2,2'-methylene bis(4-methyl-6-tertiary-butyl-phenol), 4 grams of magnesium oxide, 10 grams of zinc oxide, 20 grams of low viscosity chlorinated paraffin oil and 10 grams of the phenolic resin described in Example 2. After 20 minutes of milling at 50° C. a smooth composition is produced.

A portion of this material is heated to 100° C. and applied to two pieces of white pine with a spatula. After standing at room temperature for several days the shear strength of the bond is about 60 p.s.i. at 25° C.

A portion of this material is heated to 50° C. and used to fill an irregular crack (about ⅛-inch wide) in a pine board of ¼-inch thickness. The material is applied with a putty knife. After standing for 16 hours at room temperature the caulk changes to a soft elastomer which cannot be pulled from the crack by hand.

EXAMPLE 12

This example illustrates the preparation of a pigmented coating composition falling within the scope of this invention.

A copolymer of chloroprene and methacrylic acid is prepared essentially by the procedure presented in Example 5, with the exception that about 2 parts of methacrylic acid and 0.4 part of dodecyl mercaptan is used per 100 parts of chloroprene and polymerization is performed at 40° C. This amount of methacrylic acid corresponds to 1.05% carboxyl groups based on chloroprene. The copolymer is isolated by the procedure of Example 1 including pH adjustment with aqueous sodium hydroxide. This copolymer has a Mooney viscosity of about 84 (ML–2½) and has a combined methacrylic acid content of about 1.1% (0.57% carboxyl groups).

A coating composition is prepared by milling 50 grams of this copolymer, 50 grams of medium thermal black, 2 grams of magnesium oxide, 2.5 grams of zinc oxide and 1 gram of 2,2'-methylene bis(4-methyl-6-tert-butyl phenol) for about 10 minutes and adding the mill mix to a solution of modified phenolic resin prepared in accordance with the directions given in Example 4. The entire mixture is churned until smooth.

A portion of this product is poured onto a film of polyethylene terephthate, permitted to flow out of its own weight and allowed to dry. The material dries to form a non-sticky surface within about 30 minutes. The coating is smooth and uniform in appearance. However, a control coating prepared from a conventional chloroprene polymer is still sticky after 2 hours, and forms a non-sticky surface only after about 16 hours; its surface is more irregular than that of the chloroprene/methacrylic acid copolymer coating.

Pine boards bonded together with the composition of this example have a bond shear strength of about 220 p.s.i. at room temperature.

EXAMPLE 13

A copolymer of chloroprene and methacrylic acid containing about 0.24% carboxyl groups is prepared essentially by the procedure of Example 5 with the exceptions that 1.33 parts of methacrylic acid and 0.3 part of dodecyl mercaptan is used per 100 parts of chloroprene and polymerization is performed at 40° C. The copolymer is isolated by the procedure of Example 1 including adjustment with aqueous sodium hydroxide.

A cement is prepared from 25 grams of this copolymer following the procedure given in Example 4 with the exception that the tolene-hexane-ethyl acetate solution of magnesium oxide modified phenolic resin is prepared at half the scale used in Example 4.

About 0.25 gram of hexamethylene diisocyanate is stirred into 25 grams of the solvent adhesive prepared above. Stirring is continued for about a minute. The added diisocyanate serves as a curing agent and improves the adhesion of cement to nonporous substrates.

Steel-to-steel and "Formica"-to-"Formica" bonds are prepared using this adhesive. ("Formica" is a high-pressure laminated sheet material of reinforced melamine and phenol resins.) The substrates are coated with the cement and a 2 square inch overlap is allowed. After about 3 weeks at room temperature, shear strengths are determined on the test bonds. The shear strengths of the steel-to-steel bonds are about 184 p.s.i. at room temperature and about 15 p.s.i. at 100° C. The "Formica"-to-"Formica" bond strengths are about 130 p.s.i. at room temperature and about 11 p.s.i. at 100° C.

EXAMPLE 14

This example illustrates the preparation of solvent adhesives containing a thermoplastic resin.

Two copolymers of chloroprene and methacrylic acid are prepared essentially by the procedure of Example 1 with the exceptions that about 1.5 parts of methacrylic acid and 0.89 part of diisopropyl xanthogen disulfide are used per 100 parts of chloroprene. The two copolymers differ in that one is polymerized at about 10° C. (Copolymer 14A), the other at about 40° C. (Copolymer 14B). Copolymer 14A has a Mooney viscosity of about 44 (ML–2½); Copolymer 14B a Mooney viscosity of about 46. Both contain approximately 0.54% combined methacrylic acid (0.28% carboxyl groups).

Adhesive base compounds are prepared from these two copolymers by mill mixing the ingredients given in the following recipe:

| | Parts |
|---|---|
| Copolymer | 100 |
| Magnesium oxide | 4 |
| Zinc oxide | 5 |
| 4,4'-thiobis(6-tert-butyl-m-cresol) | 2 |

The base compounds are added to agitated vessels containing 45 parts of a thermoplastic terpene modified phenol-formladehyde resin ("Durez 12603," M.P. 302° F., soluble in non-polar solvents, made by Durez Division, Hooker Electrochemical Co.), and 200 parts each of toluene, hexane and ethyl acetate. The two mixtures are agitated until smooth homogeneous solvent cement compositions are produced. The Brookfield viscosity of the cement prepared from Copolymer 14A is about 280 cps. (No. 2 spindle, 12 r.p.m.); that prepared from Copolymer 14B is about 330 cps.

Canvas-to-canvas bonds are prepared from the cements corresponding to Copolymers 14A and B and tested at various temperatures. Typical data are presented in the following table along with the results obtained from a control cement differing only in that a conventional chloroprene polymer is used:

TABLE VI

| Temperature, °C. | Copolymer 14A Cement Bond Strength, p.p.l.i. | Copolymer 14B Cement Bond Strength, p.p.l.i. | Control Cement Bond Strength, p.p.l.i. |
|---|---|---|---|
| 60 | 14 | 14 | 5.5 |
| 80 | 13 | 12 | 1 |
| 100 | 9 | 7 | 0.5 |
| 120 | 6 | 5 | 0.5 |

As indicated hereinbefore, the solvent cement compositions of this invention which contain thermoplastic phenolic resins have a tendency to gel when stored. Cements of the type prepared in this example remain in usable condition for periods ranging from 2 to 6 weeks.

The tack life of the cements prepared from Copolymers 14A and B is similar to that observed for the control cement. For thin films of cement, tack life is between 5 to 15 minutes. With thick films, tack life ranges from 10 to 25 minutes.

The rate of cohesive bond strength development at 24° C. is measured for the cements prepared above. For each of the three cements, including the control, a series of canvas-to-canvas test samples is prepared and bond strength is measured at increasing time intervals following assembly. The information is presented in the following table and clearly illustrates the outstanding rate of bond strength development for the cement compositions of the present invention.

TABLE VII

| Time After Assembly of Canvas-to-Canvas Bond | Bond Strength, p.p.l.i. | | |
|---|---|---|---|
| | Copolymer 14A Cement | Copolymer 14B Cement | Control Cement |
| 1 hour | 14 | 8 | 1.5 |
| 3 hours | 20 | 29 | 8 |
| 1 day | 24 | 24 | 19 |
| 1 week | 27 | 28 | 15 |

EXAMPLE 15

Adhesive base compounds are prepared from Copolymers 14A and 14B by milling the recipes presented in Example 14.

The base compounds are added to agitated vessels containing 200 parts of hexane and 200 parts of ethyl acetate. In the meantime, two preparations of magnesium oxide modified resin are made by agitating 45 parts of the phenolic resin described in Example 2, 4 parts of magnesium oxide and 1 part of water in 200 parts of toluene for about 6 hours at room temperature. One preparation of magnesium oxide modified resin is added to each of the vessels containing the base compounds and the mixtures are agitated until smooth cement compositions are produced.

The rate of bond strength development at 24° C. is measured for these two cements and for a third cement which differs only in that it is prepared from a conventional chloroprene polymer. For each of the three cements a series of canvas-to-canvas test samples is prepared and bond strength is measured at increasing time intervals following assembly. The information obtained is presented in the following table and again illustrates the outstanding rate of bond strength development for the cement compositions of the present invention.

TABLE VIII

| Time After Assembly of Canvas-to-Canvas Bond | Bond Strength, p.p.l.i. | | |
|---|---|---|---|
| | Copolymer 14A Cement | Copolymer 14B Cement | Control Cement |
| 1 hour | 13 | 10 | 4 |
| 3 hours | 18 | 20 | 10 |
| 1 day | 23 | 23 | 32 |
| 1 week | 26 | 26 | 31 |

EXAMPLE 16

An emulsion is prepared using the following recipe:

| | Parts |
|---|---|
| Chloroprene | 980 |
| Acrylic acid | 20 |
| Diisopropyl xanthogen disulfide | 9 |
| Triethanol - ammonium dodecylbenzenesulfonate (60% aqueous solution) | 20 |
| Sodium salt of formaldehyde-naphthalene-sulfonic acid condensate | 6 |

The emulsion, maintained in an atmosphere of nitrogen, is heated to 40° C. One part by weight of cumene hydroperoxide is added, and polymerization is then initiated by the addition of a solution containing 1 part of sodium hydrosulfite and 0.2 part of sodium hydroxide in 100 parts by volume of water. Polymerization is maintained by dropwise addition of this solution until the specific gravity of the emulsion is 1.075 (88% monomer conversion). In all, 24 parts by volume of the solutions are required. Polymerization is arrested by addition of 15 parts of an emulsion containing the following ingredients:

| | Parts |
|---|---|
| Phenothiazine | 1 |
| p-Tert-butylpurocatechol | 1 |
| Toluene | 64.2 |
| Water | 29.85 |
| Sodium dodecylsulfate | 2.84 |
| Sodium salt of formaldehyde-naphthalene-sulfonic acid condensate | 1 |

The pH of the emulsion is adjusted to 8 by the addition of a 2% sodium hydroxide solution. The excess chloroprene is removed and the polymer is recovered as described in Example 1. The isolated polymer has a Mooney viscosity at 100° C. (ML+2.5) of 32. The methacrylic acid content, determined on a reprecipitated sample containing no unreacted monomer, is 0.15% (carboxyl content of 0.08%).

The polymer is compounded using the following recipe:

| | Parts |
|---|---|
| Polymer | 100 |
| Magnesium oxide | 8 |
| Zinc oxide | 5 |
| N-phenyl-2-naphthylamine | 2 |

Fifty-seven grams of the compounded stock are added to 290 ml. of a mixture of 990 ml. of toluene, 960 ml. of ethyl acetate and 1305 ml. of hexane, together with 20 g. of the heat-reactive phenolic resin used in Example 2, and 0.5 ml. of water. The mixture is rolled until a smooth cement is obtained.

For comparison, cement is prepared in a similar manner using the same conventional chloroprene polymer used in Example 2. Samples of the cements are aged in an oven maintained at 50° C. After two weeks the cement containing the conventional chloroprene polymer has separated into two layers. The cement from the carboxyl-containing copolymer is stable for an indefinite period.

EXAMPLE 17

Two emulsions are prepared using the following recipes:

| | Parts | |
|---|---|---|
| | A | B |
| Chloroprene | 787 | 690 |
| 2,3-Dichloro-1,3-butadiene | 200 | 290 |
| Methacrylic acid | 13 | 20 |
| Diisopropyl xanthogen disulfide | 9 | 9 |
| Water | 1,150 | 1,150 |
| Triethanolammonium dodecylbenzene-sulfonate (60% aqueous solution) | 20 | 20 |
| Sodium salt of formaldehyde-naphthalene-sulfonic acid condensate | 6 | 6 |

Polymerization is carried out as described in Example 16, and is carried out to a monomer conversion of 85%. The isolated polymers have Mooney viscosities of 56 and 60, respectively, methacrylic acid contents of 0.54 and 0.45%, respectively, and carboxyl contents of 0.28 and 0.50, respectively.

Cements prepared from these polymers and tested as described in Example 16 remain stable (that is, do not form separate phases) for an indefinite period.

EXAMPLE 18

Two emulsions are prepared having the following compositions:

| | Parts | |
|---|---|---|
| | A | B |
| Acrylonitrile | 19.8 | |
| Chloroprene | 29.4 | 50 |
| Methacrylic acid | 0.8 | |
| Diisopropyl xanthogen disulfide | 0.3 | 0.55 |
| Water | 50 | 50 |
| Triethanolammonium dodecylbenzene-sulfonate (60% aqueous solution) | 1.2 | 1.1 |
| Sodium salt of formaldehyde-naphthalenesulfonic acid condensate | 0.5 | 0.5 |

Polymerization is carried out essentially as described in Example 5 except that the temperature is maintained at 40° C. Polymerization of emulsion A is initiated and emulsion B is continuously added to emulsion A during the polymerization. The oxidizing component of the catalyst is a 2% aqueous solution of potassium persulfate containing 0.1% sodium 2-anthraquinonesulfonate. An 0.5% aqueous sodium hydrosulfite solution containing 0.2% sodium hydroxide is used as the reducing component. Conversion is carried to 80%, and polymerization is stopped by adding a stabilizer emulsion containing the following ingredients:

| | Parts |
|---|---|
| 2,6-di-tert-butyl-4-phenylphenol | 39.3 |
| Toluene | 25.6 |
| Phenothiazine | 1 |
| 2,5-di-tert-butylhydroquinone | 1 |
| Water | 30 |
| Sodium dodecylsulfate | 2.8 |
| Sodium salt of formaldehyde-naphthalenesulfonic acid condensate | 1 |

The pH of the emulsion is adjusted to 7–8 by the addition of 2% aqueous sodium hydroxide. Unreacted monomer is removed and the polymer is isolated by freeze coagulation as described in U.S. Patent 2,187,146. The isolated copolymer has a Mooney viscosity (ML–2.5, 100° C.) of about 51. The copolymer typically has the following composition by weight, expressed as combined monomers:

| | Percent |
|---|---|
| Chloroprene | 90.2 |
| Acrylonitrile | 9.4 |
| Methacrylic acid | 0.4 |

The combined carboxyl content is 0.21% by weight.
The polymer masterbatch is prepared having the following composition:

| | Parts |
|---|---|
| Copolymer | 100 |
| 2,2'-methylenebis(6-tert-butyl-p-cresol) | 2 |
| Magnesium oxide | 4 |
| Zinc oxide | 5 |

A resin solution is prepared having the following composition:

| | Parts |
|---|---|
| Resin (same as in Example 2) | 10 |
| Methyl ethyl ketone | 60 |
| Toluene | 65 |
| Magnesium oxide | 1 |

A cement is prepared by dissolving 25 grams of the polymer masterbatch in the resin solution. The cement remains stable even after standing at room temperature for seven months. A control cement, prepared from a chloroprene-acrylonitrile copolymer containing no copolymerized methacrylic acid, stratifies within one day. When the chloroprene-acrylonitrile-methacrylic acid copolymer is used to prepare a similar cement except that no resin is included, the cement is unstable and gels within 2 months at room temperature.

Another cement is prepared from the copolymer as follows.

The following ingredients are dispersed in a ball mill:

| | Parts |
|---|---|
| Magnesium oxide | 4 |
| Zinc oxide | 3.3 |
| Toluene | 14 |
| 2,2'-methylenebis(6-tert-butyl-p-cresol) | 2 |

This dispersion is added to the following solution and rolled in a jar until a smooth cement is formed:

| | Parts |
|---|---|
| Copolymer | 100 |
| Resin (same as in Example 2) | 40 |
| Toluene | 218 |
| Methyl ethyl ketone | 232 |

Bond strengths in canvas-to-canvas adhesions are determined at room temperature as follows:

| Bond age: | P.p.l.i. |
|---|---|
| 4 hours | 12 |
| 1 day | 43 |

Strengths of bonds of canvas to a synthetic shoe upper based on polyvinyl chloride are as follows:

| Bond Age | Temperature (° C.) | P.p.l.i. |
|---|---|---|
| 4 min | 25 | 10.5 |
| 4 hrs | 25 | 11.5 |
| 1 day | 25 | 15 |
| 7 days | 25 | 22 |
| 7 days | 70 | 3.5 |

It is regarded as being within the scope of this invention to replace the methacrylic or acrylic acid in the copolymers with another vinyl monomer containing an activated double bond and at least one carboxyl group.

Thus, the vinyl monomers which may be used in preparing the copolymers, which in turn find use in preparing the compositions of the present invention, must contain a carboxyl group and their double bonds must be activated by an adjacent carboxyl, keto-carbonyl or nitrile group.

Representative vinyl monomers which are useful are compounds having the following general formulas:

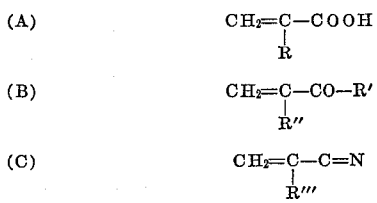

Compounds having general formula (A) wherein R may be hydrogen, alkyl (e.g., ethyl, propyl or butyl), aryl cycloalkyl or arylalkyl include acrylic acid and its homologues. These compounds are the preferred comonomers because they may be copolymerized with chloroprene with ease and they are readily available in commercial quantities. Within this class of compounds, acrylic acid and its lower alkyl-substituted homologues are preferred, with methacrylic acid being especially preferred.

Compounds having general formula (B), wherein R' may be alkyl, aryl, cycloalkyl or arylalkyl and R" may be hydrogen, alkyl, aryl, cycloalkyl or arylalkyl, with the proviso that R' and R" bear a carboxyl group, and compounds having general formula (C) wherein R''' may be alkyl, aryl, cycloalkyl and arylalkyl, with the proviso that R''' bears a carboxyl group, may be used as vinyl monomers in preparing copolymers which may be employed in the present invention. No monomers having these general formulas are commercially available at present. It is well known, however, that vinyl compounds, in which the double bond is activated by a keto or nitrile group, may be copolymerized with chloroprene as disclosed in U.S. Patent 2,066,331.

As used herein the term "carboxyl-containing chloroprene copolymers" includes those wherein part of the chloroprene, up to an equal amount by weight, may be replaced by another organic monomer which does not contain a carboxyl group but which is copolymerizable with chloroprene. Suitable monomers include the following types: vinyl-substituted aromatic compounds, such as styrene, vinyl-toluenes, and vinylnaphthalenes; esters and nitriles of acrylic acid and methacrylic acid, such as methyl methacrylate and acrylonitrile; and compounds containing conjugated double bonds, such as 1,3-butadiene, isoprene, and 2,3-dichloro-1,3-butadiene. Likewise, the copolymer may be prepared in the presence of such materials as sulfur and sulfur dioxide so that the final copolymer will contain, respectively, polysulfide or sulfonyl linkages.

In describing the preparation of the blends of the carboxyl-containing copolymers with a non-carboxyl-containing chloroprene polymer, the non-carboxyl-containing chloroprene polymer has been referred to as a "conventional chloroprene polymer" which may be a homopolymer of chloroprene or a copolymer of chloroprene with up to an equal amount of at least one other monomer of the type described above. Also, the conventional chloroprene homopolymer or copolymer may contain polysulfide or sulfonyl linkages.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:
1. A stable solvent cement and coating composition comprising (I) an organic solvent solution of a carboxyl-containing chloroprene polymer selected from the group consisting of (a) a

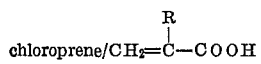

copolymer wherein R is hydrogen or $C_1$ to $C_4$ alkyl, which copolymer contains from about 0.02 to about 0.7 weight percent carboxyl groups, and (b) a mixture of a

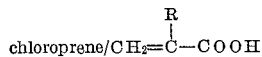

copolymer containing up to about 1 weight percent carboxyl groups, with a conventional chloroprene polymer, said mixture containing from about 0.02 to 0.4 weight percent carboxyl groups based on the total weight of polymer mixture; (II) an oil-soluble phenol-aldehyde resin in an amount of from 10 to 100 parts per 100 parts of chloroprene polymer; and (III) an alkaline stabilizing ingredient selected from the group consisting of magnesium oxide, calcium oxide, calcium sulfide, lead oxide and mixtures thereof in amounts at least equivalent to 2 parts of magnesium oxide per 100 parts of chloroprene polymer.

2. A composition as defined in claim 1 wherein the concentration of carboxyl groups in chloroprene polymers I(a) and mixture I(b) is from about 0.1 to 0.4 weight percent.

3. A composition as defined in claim 1 wherein said alkaline stabilizing ingredient is magnesium oxide.

4. A composition as defined in claim 1 wherein the amount of phenol-aldehyde resin (II) ranges from about 20 to 70 parts per 100 parts of carboxyl-containing chloroprene polymer.

5. A composition as defined in claim 1 wherein the carboxyl-containing chloroprene polymer is a chloroprene/methacrylic acid copolymer.

6. A composition as defined in claim 1 wherein the oil-soluble phenol-aldehyde resin is an alkaline-modified phenolic resin prepared by the alkaline condensation of 1 mole of a para-substituted lower alkyl phenol with 1 to 2 moles of formaldehyde.

References Cited by the Examiner
UNITED STATES PATENTS

| | | | |
|---|---|---|---|
| 2,610,910 | 9/1952 | Thomson | 260—845 |
| 2,916,471 | 12/1959 | Rosahl et al. | 260—845 |
| 3,086,951 | 4/1963 | Dollahausen et al. | 260—845 |

MURRAY TILLMAN, *Primary Examiner.*

J. C. BLEUTGE, *Assistant Examiner.*